United States Patent [19]

Schrauzer et al.

[11] 4,113,590

[45] Sep. 12, 1978

[54] PHOTOREDUCTION OF NITROGEN

[75] Inventors: Gerhard N. Schrauzer; Ted D. Guth, both of La Jolla, Calif.

[73] Assignee: The Regents of the University of California, Berkeley, Calif.

[21] Appl. No.: 812,478

[22] Filed: Jul. 5, 1977

[51] Int. Cl.$^2$ ............................................. B01J 1/10
[52] U.S. Cl. ............................................. 204/157.1 R
[58] Field of Search ................ 204/157.1 R, DIG. 11

[56] References Cited

U.S. PATENT DOCUMENTS

| | | | |
|---|---|---|---|
| 3,925,212 | 12/1975 | Tchernev | 204/157.1 R |
| 4,012,301 | 3/1977 | Rich et al. | 204/DIG. 11 |

Primary Examiner—Howard S. Williams
Attorney, Agent, or Firm—Christie, Parker & Hale

[57] ABSTRACT

Nitrogen is reduced to ammonia, hydrazine, and mixtures thereof by reaction with water on a solid metal oxide irradiated with ultraviolet light. Useful metal oxides include titanium dioxide and metal-doped titanium dioxide. Titanium dioxide doped with iron, cobalt, molybdenum or nickel is preferred. The metal oxide is irradiated in the presence of nitrogen and water with ultraviolet light from a source such as a mercury arc lamp or sunlight. The nitrogen and the water may be in the vapor phase, or they may be adsorbed on the metal oxide. In addition, liquid water may be present. The ammonia which is formed may be recovered in a number of ways, for example, by heating the metal oxide gently under vacuum, by water extraction, or by adsorption in an acid acceptor. The recovered ammonia may be used as an agricultural fertilizer either directly or in the form of ammonium nitrate, sulfate, or phosphate salts.

16 Claims, No Drawings

PHOTOREDUCTION OF NITROGEN

BACKGROUND OF THE INVENTION

1. Field of the Invention

This invention relates to the fixation of nitrogen by reduction to ammonia and hydrazine. It converts elemental nitrogen, for example, gaseous nitrogen from the air, to a form useable as or in the preparation of agricultural fertilizers. It provides a way to synthesize ammonia from nitrogen and water at ambient pressures and temperatures without the use of elemental hydrogen. It also provides a method for using solar radiation in the preparation of agricultural fertilizers.

Ammonia is an important starting material in the production of nitrogen fertilizers. It is presently synthesized almost exclusively by the reaction of molecular nitrogen and hydrogen at high temperatures and pressures in the presence of an iron catalyst. The nitrogen is obtained from the air. The hydrogen is synthesized by reactions involving fossil fuels such as coal or natural gas. This invention provides a method for making ammonia which is not dependent on the use of fossil fuels.

2. Description of the Prior Art

The use of iron oxide catalyst in the synthesis of ammonia has been disclosed. U.S. Pat. No. 2,500,008 describes the synthesis of ammonia from hydrogen and nitrogen which are contacted with finely divided iron oxide catalyst and subjected to ultrasonic vibrations. However, the use of water instead of hydrogen and the use of ultraviolet light are not disclosed.

U.S. Pat. No. 3,378,475 describes the oxidation of nitrogen from air by passing air through an aqueous suspension of a catalyst such as iron oxide while irradiating with high energy ionizing radiation such as nuclear radiation, gamma rays, or x-rays. The reduction of nitrogen with the use of ultraviolet light is not described.

U.S. Pat. No. 3,925,212 describes the use of titanium dioxide as a semiconductor electrode in a solar photoelectric cell for the decomposition of water to hydrogen and oxygen.

The photoreduction of acetylene to reduced hydrocarbons with the use of titanium dioxide catalyst and ultraviolet light has been described by Boonstra and Mutsaers in the Journal of Physical Chemistry, Volume 79, page 2025 (1975).

SUMMARY OF THE INVENTION

The present invention provides an improved method for fixing nitrogen, for example, nitrogen from air, by reduction to ammonia and hydrazine, and also provides a method for preparing catalysts useful for reduction of nitrogen. The nitrogen is reduced by reaction with water on certain solid metal oxide catalysts, i.e., titanium dioxide and metaldoped titanium dioxide catalysts, under the influence of ultraviolet light. The method may be conveniently practiced at relatively low pressures, for example, one atmosphere, and moderate temperatures between about 0° C and 200° C, typically between about 20° C and 60° C. The use of gaseous hydrogen is avoided and solar radiation may be used as the source of ultraviolet light.

In the practice of this invention the metal oxide is irradiated with ultraviolet light in the presence of nitrogen and water. The reaction takes place at the catalyst surface between nitrogen and water, producing ammonia, some hydrazine, and oxygen. Under proper conditions little or no hydrazine is produced. The ammonia may be recovered for use directly as an agricultural fertilizer or for use in the preparation of fertilizer salts such as ammonia nitrate, ammonium phosphate, and ammonium sulfate.

DETAILED DESCRIPTION OF THE INVENTION

Metal oxides useful in the practice of this invention include titanium dioxide and titanium dioxide doped with iron, cobalt, molybdenum, or nickel. Iron, cobalt and molybdenum are preferred dopants, particularly iron.

The metal oxides are preferably used in a form which has a high surface area for contact with nitrogen and water and for exposure to ultraviolet light. Finely divided powders having particle sizes from about 0.5 to about 5 microns in diameter are preferred. The metal oxide may also be placed on a support having high surface area, such as a panel or matrix of a material inert under the reaction conditions employed. Glass, stainless steel, polypropylene and the like may be used. Unsupported metal oxide powders may be agitated or tumbled during irradiation to increase their effective surface area. They may be suspended in a stream of gaseous nitrogen and water vapor during irradiation, or they may be suspended in water through which nitrogen is bubbled.

The metal oxides are prepared for use by heating in air or under an inert atmosphere such as argon or in a vacuum at temperatures on the order of 250° C to 1500° C to drive off harmful impurities such as adsorbed oxygen and carbon monoxide. The heated metal oxide is cooled in an inert atmosphere such as argon, in vacuum, or, preferably, in an atmosphere consisting essentially of nitrogen and water vapor. Cooling the metal oxide in the presence of nitrogen and water vapor provides a catalyst with a higher initial activity because the reactants are already present on the surface of the catalyst.

The rutile form of titanium dioxide is substantially more active than the anatase form. Titanium dioxide of high purity, for example 99.9 percent pure, is available in fine powder, such as two micron powder, in the anatase form. Anatase titanium dioxide is converted partly or entirely to the rutile form by heating for between about 0.1 hour to 10 hours at temperatures between about 750° C and about 1500° C. Typically, the anatase is heated for between 1 and 5 hours at about 1000° C. After about 5 hours at 1000° C, the conversion from anatase to rutile is nearly complete, for example, about 95 percent complete. The heated titanium dioxide is then cooled, preferably in an atmosphere of nitrogen and water vapor.

Titanium dioxide doped with certain metals, including iron, cobalt, molybdenum and nickel, has higher activity than undoped titanium dioxide. Particularly useful as a dopant is iron. Cobalt and molybdenum are nearly as good. Nickel provides some increase in activity but is not as desirable as the other three. The metal-doped titanium dioxide may contain between about 0.05 and about 5 weight percent or more of the metal dopant, calculated as the free metal. Minor amounts between about 0.1 and 0.5 weight percent have given more desirable results. For example, titanium dioxide containing 0.14 weight percent iron (0.2 weight percent $Fe_2O_3$) appeared to be more active than titanium dioxide containing less or more iron.

Doped titanium dioxide may be prepared by treating $TiO_2$ powder with an aqueous solution of a salt of the desired metal, such as a bromide, chloride, fluoride, iodide, nitrate, sulfate, acetate, trifluoroacetic acetylacetonate, or formate, and then heating in an oxidizing atmosphere to drive off the moisture and convert the metal salt to the corresponding oxide. Sufficient metal salt is used to provide the desired concentration of metal in the doped titanium dioxide product. Techniques for doping as such are in general well known and need not be further described.

The prepared catalyst tends to lose activity over a period of several weeks upon exposure to oxygen, air, or carbon monoxide. Therefore, the catalyst is stored under inert atmosphere such as argon or helium or, preferably, under nitrogen saturated with water vapor.

The ultraviolet light may be derived from any source which is rich in ultraviolet, especially near ultraviolet in wave lengths from about 390 to about 420 nanometers. Useful sources include mercury arc lamps, carbon arc lamps, and sunlight. The higher the intensity of the ultraviolet light, the higher the yield from a given reactor. The choice of intensity level is thus a matter of economics rather than of operability.

In the practice of the invention the metal oxide is irradiated with ultraviolet light in the presence of nitrogen and water. The nitrogen may be present as gaseous nitrogen in contact with the metal oxide or it may be adsorbed or chemisorbed on the metal oxide. Similarly, the water may be present as vapor or liquid in contact with the metal oxide or it may be adsorbed or chemisorbed on the surface of the metal oxide. If a metal oxide catalyst is heated, then exposed to nitrogen and water vapor, either together or separately in any order, and is then irradiated under inert atmosphere such as argon, it has been found that some ammonia will be produced. However, the reactants present on the catalyst are quickly exhausted. Thus it is preferable to have the metal oxide catalyst in contact with nitrogen and water before and during irradiation.

In the best mode of practicing this invention which is presently contemplated, a gas-solid system is employed in which the metal oxide catalyst is maintained in contact with gaseous nitrogen and water vapor in the substantial absence of liquid water during irradiation. However, liquid water may be used in other embodiments. Thus, the catalyst is suspended in liquid water through which nitrogen is bubbled during irradiation. Catalyst having a thin surface film of water may be contacted with nitrogen gas during irradiation. In a further embodiment, water is trickled over metal oxide catalyst supported on a mesh or plate in a solar cell exposed to sunlight. The trickling water then functions both as a reactant and as an extractant to remove ammonia as it is produced, thus providing a dilute solution of aqueous ammonia for simultaneously irrigating and fertilizing fields.

When the preferred gas-solid reaction system is used, the ammonia products may be recovered in a number of ways. For example, the catalyst is heated gently in vacuum at temperatures of from 100° to 200° C to remove adsorbed ammonia, which is then condensed to liquid form. Alternatively, the ammonia is extracted from the catalyst with liquid water and the catalyst then dried and used again. The catalyst may be reused without loss of activity after ammonia is extracted with water, provided the catalyst surface is protected from contaminants. The ammonia may also be absorbed into an acid acceptor such as phosphoric acid or sulfuric acid, which is present in the irradiation chamber or in a chamber in gas communication with the irradiation chamber.

The present invention may also be practiced as a continuous process in which a gas mixture such as air or nitrogen and water vapor is continuously passed over the metal oxide catalyst during irradiation, the gas now containing ammonia is removed, and the ammonia is extracted therefrom. Desirably, after the ammonia is extracted, the gas is recycled over the metal oxide catalyst. Recycling would be particularly desirable where pure nitrogen rather than air is used.

The metal oxide catalyst is preferably contacted with a gas mixture consisting essentially of nitrogen and water vapor during irradiation. Contaminants such as oxygen, carbon monoxide, etc., which tend to decrease the activity of the catalyst are excluded, but inert gases which do not interfere with the desired reaction, such as argon and helium, may be present. If desired, air may be used instead of pure nitrogen, but some lessening of catalyst activity and therefore lower yield may be experienced.

In a gas-solid reaction system, the gas mixture must contain a substantial proportion of water vapor. Desirably, it is saturated with water vapor at the temperature and pressure of operation. Since the vapor pressure of water is fairly low at moderate temperatures, it is evident that in nitrogen or air saturated with water vapor, the ratio of water vapor to nitrogen will often be much less than the stoichiometric ratio of 3 to 1. For example, the vapor pressure of water at 60° C is 149 millimeters of mercury, so that the ratio of water vapor to nitrogen in saturated nitrogen is about 0.25 to 1 at 60° C. An auxiliary source of water vapor is therefore preferred to insure an adequate amount of hydrogen to react with the nitrogen.

During irradiation the metal oxide is kept at a temperature between about 0° C and about 200° C, for example, between about 10° C and about 100° C. With titanium dioxide catalysts, particularly iron-doped titanium dioxide, the yield of ammonia is best at temperatures between about 20° C and about 60° C.

Any convenient pressure may be used, such as atmospheric pressure or higher or lower pressures, for example, between 1 and 10 atmospheres. The yield of ammonia appears to be proportional to the partial pressure of nitrogen at pressures near one atmosphere. A significant advantage of this process is that it may be practiced at ambient atmospheric pressures.

Contact times are widely variable, depending upon temperature, pressure, intensity of radiation, surface area of the catalyst, and the design of the reactor. In batch processes, contact times as long as several hours or days may be used. In continuous processes involving continuous extraction of ammonia, shorter contact times, on the order of several seconds or minutes, are useful.

The following examples will more fully illustrate the practice of this invention.

EXAMPLE I

Titanium dioxide in the anatase form having a purity of 99.9 percent and a particle size of 2 microns was heated at 1000° C for 2 hours in air and was then cooled in a container filled with nitrogen saturated with water vapor. A 0.2 gram sample of the cooled titanium dioxide was placed in a glass bottle of 38 milliliter capacity. The bottle was closed with a rubber serum cap and flushed with pure acid-washed nitrogen gas for twenty minutes. As a control, a second bottle containing 0.2 grams of the cooled titanium dioxide was filled with pure argon. The bottles were irradiated for three hours at 30° C to 40° C with ultraviolet light from a 360 watt mercury-arc lamp located approximately 20 centimeters away. Then, a 10 milliliter portion of 1 N hydrochloric acid was injected into each bottle. After ten minutes at room temperature, 5 milliliters of the supernatant solution was transferred to a Kjeldahl flask, made alkaline with 5 milliliters of 5 N sodium hydroxide and distilled. The amount of the ammonia in the distillate was determined colorimetrically by the method of Kruse and Mellon, *J. Water Pollut.Control Fed.*, 24 1098 (1952). In the sample from the nitrogen-filled reaction flask, 0.7 to 0.9 micromole of ammonia was detected. In the sample from the argon-filled flask, 0.05 to 0.1 micromole of ammonia was detected. The remainder of the hydrochloric acid extract from each flask was used for the determination of hydrazine according to the method of Schrauzer, et al., *J.Am.Chem.Soc.* 96, 641 (1974). In the sample from the nitrogen-filled flask 0.1 to 0.2 micromole of hydrazine was detected. No hydrazine was detected in the sample from the argon-filled flask.

EXAMPLE II

Titanium dioxide powder having a purity of 99.9 percent and a particle size of 2 microns was treated with an aqueous solution of ferric sulfate. The resulting slurry was dried in a rotary evaporator, and the residue was heated in air at 1000° C for 2 hours and then cooled and equilibrated with gaseous nitrogen and water vapor at room temperature for six hours. Samples of titanium dioxide containing 0.1, 0.2, 0.3, 0.4, 0.5 and 1 weight percent $Fe_2O_3$ were prepared. Samples of 0.2 gram of titanium dioxide and the iron-doped titanium dioxides were placed in glass bottles flushed with nitrogen and irradiated as described in Example I. The ammonia produced was determined as an Example I.

Table I below shows that doping with iron substantially increases the activity of the titanium dioxide catalyst, up to about 0.5% $Fe_2O_3$.

TABLE I

PHOTOREDUCTION OF NITROGEN ON $TiO_2$ AND IRON-DOPED $TiO_2$ AT 40° and 1 ATM. OF NITROGEN PRESSURE YIELDS AFTER 3 HRS. OF IRRADIATION, EXPRESSED PER GRAM OF $TiO_2$.

| No.: | Solid: | | $NH_3$, Micrograms/g $TiO_2$ Mean: | Range: |
|---|---|---|---|---|
| 1 | $TiO_2$ | | 65 | 45 – 70 |
| 2 | $TiO_2$ | ,0.1% $Fe_2O_3$ | 550 | 300 – 600 |
| 3 | $TiO_2$ | ,0.2% $Fe_2O_3$ | 660 | 600 – 1000 |
| 4 | $TiO_2$ | ,0.3% $Fe_2O_3$ | 555 | 300 – 600 |
| 5 | $TiO_2$ | ,0.4% $Fe_2O_3$ | 530 | 280 – 580 |
| 6 | $TiO_2$ | ,0.5% $Fe_2O_3$ | 520 | 280 – 550 |
| 7 | $TiO_2$ | ,1.0% $Fe_2O_3$ | 230 | 170 – 260 |

EXAMPLE III

Titanium dioxide doped with 0.2 weight percent of ferric oxide was prepared as outlined in Example II. Samples of 0.2 grams of the doped titanium dioxide were placed into glass reaction flasks filled with nitrogen, nitrogen mixed with argon, and air, respectively. The bottles were irradiated for 3 hours at 40° C as described in Example I. The results of the ammonia determinations, shown in Table 2 below, illustrate the effect of the partial pressure of nitrogen on the yield of ammonia and also show that air is less efficient than a mixture of nitrogen and argon having a similar partial pressure of nitrogen.

TABLE 2

PHOTOREDUCTION OF NITROGEN ON IRON-DOPED $TiO_2$ AT 40° AFTER THREE HOURS OF IRRADIATON AND DIFFERENT PRESSURES OF NITROGEN AS WELL AS IN AIR.

| No.: | $N_2$Pressure (atm.) | | $NH_3$, Micrograms/g $TiO_2$ |
|---|---|---|---|
| 1 | 0 | (argon)* | 0 |
| 2 | 0.3 | (argon) | 175 |
| 3 | 0.6 | (argon) | 320 |
| 4 | 1.0 | ($N_2$ only) | 550 |
| 5 | 2.0 | ($N_2$ only) | 750 |
| 6 | ca. 0.75 | (air) | 145 |

*Entry in parentheses indicates additional component in the gas phase.

EXAMPLE IV

Samples of 0.2 gram of titanium dioxide and titanium dioxide doped with varying amounts of iron oxide were placed in glass nitrogen-filled reaction flasks and exposed to intermittent sunlight near sea level at temperatures between 25° C and 35° C for a period of two weeks. Flasks containing catalyst in the presence of argon or air were also exposed. The results of ammonia and hydrazine determinations are shown in Table 3.

TABLE 3

YIELDS OF AMMONIA AND OF HYDRAZINE FROM NITROGEN ON EXPOSURE OF UNDOPED AND Fe-DOPED $TiO_2$ TO INTERMITTENT SUNLIGHT AT TEMPERATURES BETWEEN 25 and 35°.

| No. | CONDITIONS AND CATALYST[a] | YIELDS, μMOLES | |
|---|---|---|---|
| | | $NH_3$ | $N_2H_4$ |
| 1 | $TiO_2$, 1 atm. Ar | 0 | 0 |
| 2 | $TiO_2$, .5 atm. $N_2$ | 0.74 | 0.05 |
| 3 | $TiO_2$, 1 atm. $N_2$ | 1.55 | 0.17 |
| 4 | $TiO_2$/.05 wt.-% $Fe_2O_3$, 1 atm. Ar | 0 | 0 |
| 5 | $TiO_2$/.05 wt.-% $Fe_2O_3$, 1 atm. $N_2$ | 3.20 | 0.09 |
| 6 | $TiO_2$/.2 wt.-% $Fe_2O_3$, 1 atm. $N_2$ | 4.98 | 0.12 |
| 7 | $TiO_2$/.2 wt.-% $Fe_2O_3$, 1 atm. Air | 1.89 | 0.07 |
| 8 | $TiO_2$/.5 Wt.-% $Fe_2O_3$, 1 atm. Ar | 0 | 0 |
| 9 | $TiO_2$/.5 Wt.-% $Fe_2O_3$, 1 atm. $N_2$ | 4.65 | 0.19 |
| 10 | $TiO_2$/.5 Wt.-% $Fe_2O_3$, 1 atm. Air | 2.0 | 0.11 |

[a]Sample weight: 0.2 grams. All photocatalysts were heated for 1 hr at 1000° in air and stored in $H_2O$-saturated $N_2$-filled containers. Rutile/anatase ratios for samples 1-3: 10/90; 4,5: 10/90; 6,7: 15/85; 8-10 ca. 50/50. Sample bottles were exposed to La Jolla, California sunlight in June close to sea-level for two weeks.

EXAMPLE V

Samples of titanium dioxide were impregnated with solutions of various metal salts and subsequently heated at 1000° C for 2 hours. The resulting metal-doped samples were used for the photoreduction of nitrogen as outlined in Example II. The yields of ammonia detected are given in Table 4.

TABLE 4

PHOTOREDUCTION OF NITROGEN ON METAL-DOPED $TiO_2$ ON EXPOSURE WITH A 360 Hg ARC LAMP AT THE IRRADIATION TEMPERATURE OF 40°. IRRADIATION TIME: 3 HOURS.

| No.: | $TiO_2$ doped with: | $NH_3$, Micrograms/gr. $TiO_2$ |
|---|---|---|
| 1 | 0.5% Fe | 525 |
| 2 | 0.4% Co | 375 |
| 3 | 0.4% Mo | 405 |
| 4 | 0.4% Ni | 57 |
| 5 | 0.4% Pd | 39 |
| 6 | 0.4% Pt | 40 |
| 7 | 0.4% V | 25 |
| 8 | 0.4% Cr | 20 |
| 9 | 0.4% Cu | 15 |
| 10 | 0.4% Pb | 17 |

EXAMPLE VI

Another group of doped titanium dioxide samples were prepared as described in the previous example. In addition to the ammonia yields from these doped catalysts, the ratio of rutile to anatase in each was determined by x-ray analysis. The results are summarized in Table 5.

TABLE 5

EFFECTS OF METALS ON NITROGEN PHOTOREDUCTION. YIELDS OF $NH_3$ DETERMINED AFTER 3 HRS OF UV-IRRADIATION AT 40° IN GLASS VESSELS CONTAINING 0.2 GRAMS OF THE DOPED TITANIAS AND $N_2$ AT 1 ATM.

| No. | Metal[a] | Rutile/Anatase | $NH_3$ YIELDS MICROMOLES |
|---|---|---|---|
| 1 | Fe | ca. 95:5 | 6.4 |
| 2 | Co | 30:70 | 3.8 |
| 3 | Mo | 30:70 | 4.0 |
| 4 | Ni | 10:90 | 1.76 |
| 5 | none | 95:5[b] | 1.35 |
| 6 | Pd | ca. 5:95 | 0.65 |
| 7 | Pt | 5:95 | 0.43 |
| 8 | Ag | 5:95 | 0.21 |
| 9 | Au | 5:95 | 0.25 |
| 10 | V | 5:95 | 0.25 |
| 11 | Cr | 5:95 | 0.22 |
| 12 | Pb | 5:95 | 0.19 |
| 13 | Cu | 5:95 | 0.17 |

[a]Metal concentration 0.4wt.-% in all cases. All samples were heated in air to 1000° for 2 hrs prior to rehumidification and irradiation except where indicated.
[b]After 5 hrs of heating to 1000°.

A comparison of the results of Examples V and VI shows that while iron, cobalt, and molybdenum are clearly superior, nickel also provides some increase in catalyst activity.

We claim:

1. A method for the photoreduction of nitrogen which comprises reducing nitrogen to ammonia by irradiating metal oxide selected from the group consisting of titanium dioxide and metal-doped titanium dioxide with ultraviolet light in the presence of gaseous nitrogen and water, and recovering such ammonia.

2. A method according to claim 1 in which the metal oxide is irradiated while in contact with water vapor.

3. A method according to claim 1 in which metal oxide is irradiated while in contact with liquid water.

4. A method according to claim 1 in which the metal oxide is irradiated in the presence of air as a source of nitrogen.

5. A method according to claim 4 in which water vapor is also present.

6. A method according to claim 1 in which the metal-doped titanium dioxide is doped with a metal selected from the group consisting of iron, molybdenum, cobalt and nickel 7. A method according to claim 1 in which the ultraviolet light is from sunlight.

8. A method according to claim 1 in which the temperature of the metal oxide is maintained between about 0° and 200° C during irradiation.

9. A continuous process for the production of ammonia by photoreduction of nitrogen which comprises the steps of continuously contacting metal oxide selected from the group consisting of titanium dioxide and metal-doped titanium dioxide with a gas containing molecular nitrogen while irradiating the metal oxide with ultraviolet light in the presence of water, maintaining the temperature of the metal oxide between about 0° C and about 200° C, whereby ammonia is produced, and continuously recovering ammonia.

10. A method according to claim 9 in which the water is present as vapor.

11. A method according to claim 9 in which the water is present as liquid.

12. A method according to claim 9 in which the gas is air.

13. A method according to claim 9 in which the metal-doped titanium dioxide is doped with a metal selected from the group consisting of iron, cobalt, molybdenum and nickel.

14. A method according to claim 9 wherein the ultraviolet light is from sunlight.

15. A method according to claim 9 which includes absorbing the ammonia in an aqueous solution.

16. A method according to claim 15 in which the solution is acidic.

* * * * *